United States Patent
Kehoe

[11] Patent Number: 6,152,196
[45] Date of Patent: Nov. 28, 2000

[54] FILLING AND VENTING SYSTEM FOR A FUEL TANK

[76] Inventor: Peter A. Kehoe, 2941 NE. 23rd. Ct., Pompano Beach, Fla. 33602

[21] Appl. No.: 09/257,398

[22] Filed: Feb. 25, 1999

Related U.S. Application Data

[60] Provisional application No. 60/076,270, Feb. 27, 1998, and provisional application No. 60/082,211, Apr. 17, 1998.

[51] Int. Cl.[7] .................................................. B63B 17/00
[52] U.S. Cl. .............................. 141/198; 141/40; 141/44; 141/46; 141/59; 141/95; 141/325
[58] Field of Search .................................. 141/40–46, 59, 141/95, 198, 325–327

[56] References Cited

U.S. PATENT DOCUMENTS

| | | | |
|---|---|---|---|
| 2,885,147 | 5/1959 | Dunning | 235/144 |
| 3,008,608 | 11/1961 | Wilson et al. | 222/35 |
| 3,044,484 | 7/1962 | Dunning | 137/469 |
| 3,129,883 | 4/1964 | Wilson | 235/144 |
| 3,299,704 | 1/1967 | Wilson | 73/200 |
| 3,309,018 | 3/1967 | Wilson | 235/94 |
| 4,503,994 | 3/1985 | Pyle | 141/198 |
| 4,726,492 | 2/1988 | Komukai | 222/14 |
| 4,930,665 | 6/1990 | Devine | 222/28 |
| 5,257,720 | 11/1993 | Wulc et al. | 222/20 |
| 5,332,008 | 7/1994 | Todd et al. | 141/5 |
| 5,590,697 | 1/1997 | Benjey et al. | 141/59 |
| 5,649,577 | 7/1997 | Farkas | 141/198 |
| 5,673,736 | 10/1997 | Farkas | 141/198 |
| 5,727,603 | 3/1998 | Langlois | 141/1 |
| 5,735,435 | 4/1998 | Kobayashi et al. | 222/63 |
| 5,762,118 | 6/1998 | Epworth et al. | 141/198 |
| 5,950,688 | 9/1999 | Langlois | 141/44 |

FOREIGN PATENT DOCUMENTS

| | | |
|---|---|---|
| 0 761 487 A2 | 3/1997 | European Pat. Off. . |
| 0 761 487 A3 | 4/1998 | European Pat. Off. . |

*Primary Examiner*—J. Casimer Jacyna
*Attorney, Agent, or Firm*—Gifford, Krass, Groh, Sprinkle, Anderson & Citkowski, P.C.

[57] ABSTRACT

In accordance with the present invention, there is provided a filling and venting system for a fuel tank which includes a canister having a fill section and a vent section defined therein. The fill section including a fuel inlet portion for the introduction of fuel thereinto and a fuel outlet portion configured to be attached to a fuel tank for directing fuel thereto. The vent section includes a vapor outlet port configured to be attached to a vent and a vapor inlet port configured to be attached to the fuel tank to permit vapor to pass from the fuel tank, through the canister and to the vent. The vapor inlet port is configured to project into the fuel tank to a level below a level at which the fuel outlet port enters the fuel tank. A partition assembly includes a wall separating the fill section and the vent section. The wall includes an opening defined therein which permits fluid to flow therethrough. The partition assembly further includes a floatable sealing member which is disposed so as to cover the opening in the wall to prevent fluid flow therethrough when a level of liquid in the canister is below a predetermined value and to uncover the opening when the level of liquid is above the predetermined value.

6 Claims, 2 Drawing Sheets

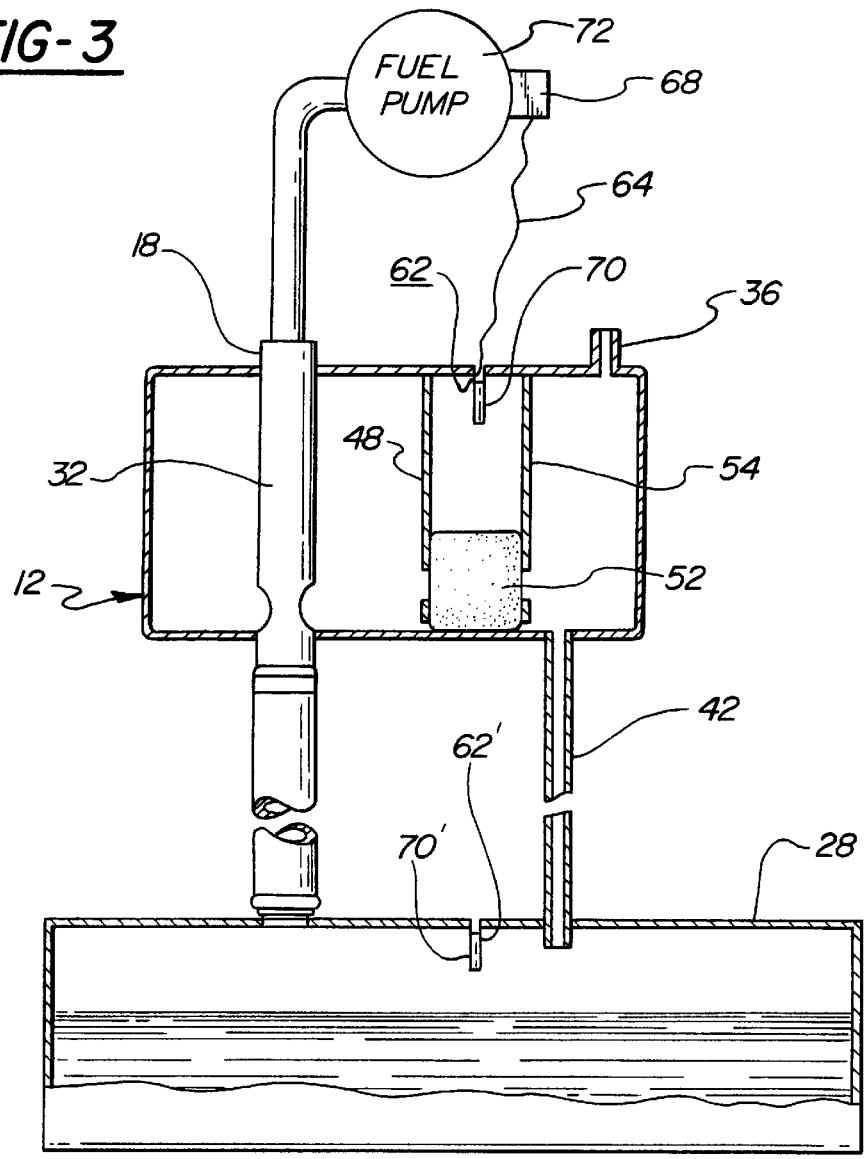
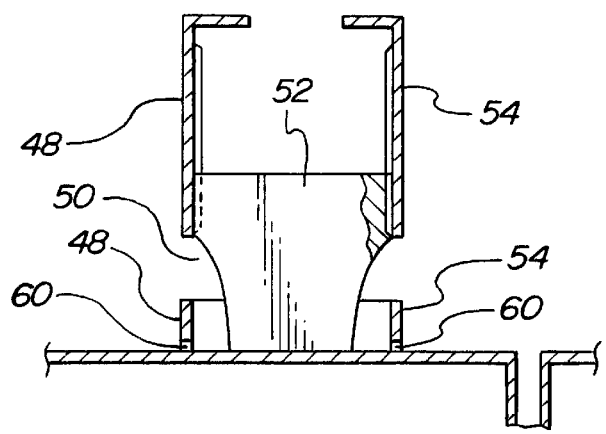

6,152,196

FILLING AND VENTING SYSTEM FOR A FUEL TANK

RELATED APPLICATIONS

This application claims priority of U.S. Provisional Application Ser. No. 60/076,270 filed Feb. 27, 1998 and Ser. No. 60/082,211 filed Apr. 17, 1998.

FIELD OF THE INVENTION

This invention relates generally to fuel delivery systems. More specifically, the invention relates to fuel delivery systems for vehicles such as watercraft, aircraft and land vehicles. Most specifically, the invention relates to a system which allows for continuous venting of a fuel tank, while preventing fuel spills caused during refueling operations by the movement or sloshing of the fuel in the tank during the use of the vehicle.

BACKGROUND OF THE INVENTION

Spillage of fuel is both wasteful and a significant source of pollution and is perhaps one of the major environmental problems impacting the oceans and waterways of the world. The problem is particularly severe in a marine environment, since spilled fuel can also be a fire or explosion hazard, as well as a direct source of pollution and waste. Fuel spillage can occur during refueling of a vehicle as a result of overfilling or fuel surging back up a filler neck as a result of inadequate ventilation or erratic pressure in the refueling line. Fuel spillage also can occur during the use of a vehicle as a result of fuel splashing up through a fuel tank vent or through an improperly closed fuel filler port. A number of venting and valving systems have been proposed in the prior art; however, these systems often rely upon the use of pressure responsive valves, complex fuel channels and the like. An example of a fuel retention fuel tank is shown in EP 761487. As a result, such systems are expensive, prone to failure, and often difficult to retrofit onto an existing vehicle.

The present invention is directed to a fuel filling and venting system which is simple in design and highly reliable. The system of the present invention is relatively low in cost, and may be readily installed into existing vehicles. The system of the present invention permits continuous venting of a fuel tank, while preventing back venting and surging of fuel during filling or use of the vehicle.

In other embodiments of the present invention, there is provided a fueling system having a sensor which is operative to automatically shut off a fuel pump when the fuel tank is full.

SUMMARY OF THE INVENTION

In accordance with the present invention, there is provided a filling and venting system for a fuel tank which includes a canister having a fill section and a vent section defined therein. The fill section including a fuel inlet portion for the introduction of fuel thereinto and a fuel outlet portion configured to be attached to a fuel tank for directing fuel thereinto. The vent section includes a vapor outlet port configured to be attached to a vent and a vapor inlet port configured to be attached to the fuel tank to permit vapor to pass from the fuel tank, through the canister and to the vent. The vapor inlet port is configured to project into the fuel tank to a level below a level at which the fuel outlet port enters the fuel tank. A partition assembly includes a wall separating the fill section and the vent section. The wall includes an opening defined therein which permits fluid to flow therethrough. The partition assembly further includes a floatable sealing member which is disposed so as to cover the opening in the wall to prevent fluid flow therethrough when a level of liquid in the canister is below a predetermined value and to uncover the opening when the level of liquid is above the predetermined value.

BRIEF DESCRIPTION OF THE DRAWINGS

Other advantages of the present invention will be readily appreciated as the same becomes better understood by reference to the following detailed description when considered in connection with the accompanying drawings wherein:

FIG. 2 is a side view, partially in cross-section, of an alternative float embodiment of the present invention; and FIG. 3 is a schematic illustration, partially in cross-section, showing essentially the FIG. 1A embodiment incorporated into a fueling system in accordance with the present invention.

DETAILED DESCRIPTION OF THE INVENTION

The present invention may be utilized in connection with the fuel systems of a variety of motor vehicles such as aircraft, construction equipment, sport utility vehicles and the like. The system of the present invention has particular advantage in connection with the fuel delivery systems of watercraft, and one preferred embodiment of the invention will be described with reference to a marine fuel system; although it is to be understood that other embodiments of the invention may be utilized for other vehicles.

In general, the filling and venting system of the present invention is based upon a canister having a fill section and a venting section defined therein. The fill section includes a fuel inlet port and a fuel outlet port. The outlet port is in fluid communication with a fuel tank. The vent section of the canister includes a vapor outlet port, which is attached to a vent, which in marine applications is typically disposed on the outer hull of a boat, above the water line. The vent section includes a vapor inlet port which is configured to be attached to the fuel tank. As will be described hereinbelow, the vapor inlet port typically projects into the fuel tank a short distance below the level of the fuel inlet.

The system of the present invention also includes a partition assembly which includes a wall that separates the fill section and the vent section. The wall has an opening formed therein which permits fluid to flow between the two sections. The partition assembly also includes a floatable sealing member which is disposed so as to cover the opening in the wall and prevent fuel from flowing through the opening. In the event that liquid accumulates in the canister, the float will rise and uncover the opening permitting fuel flow between the two sections.

Figure 1A:
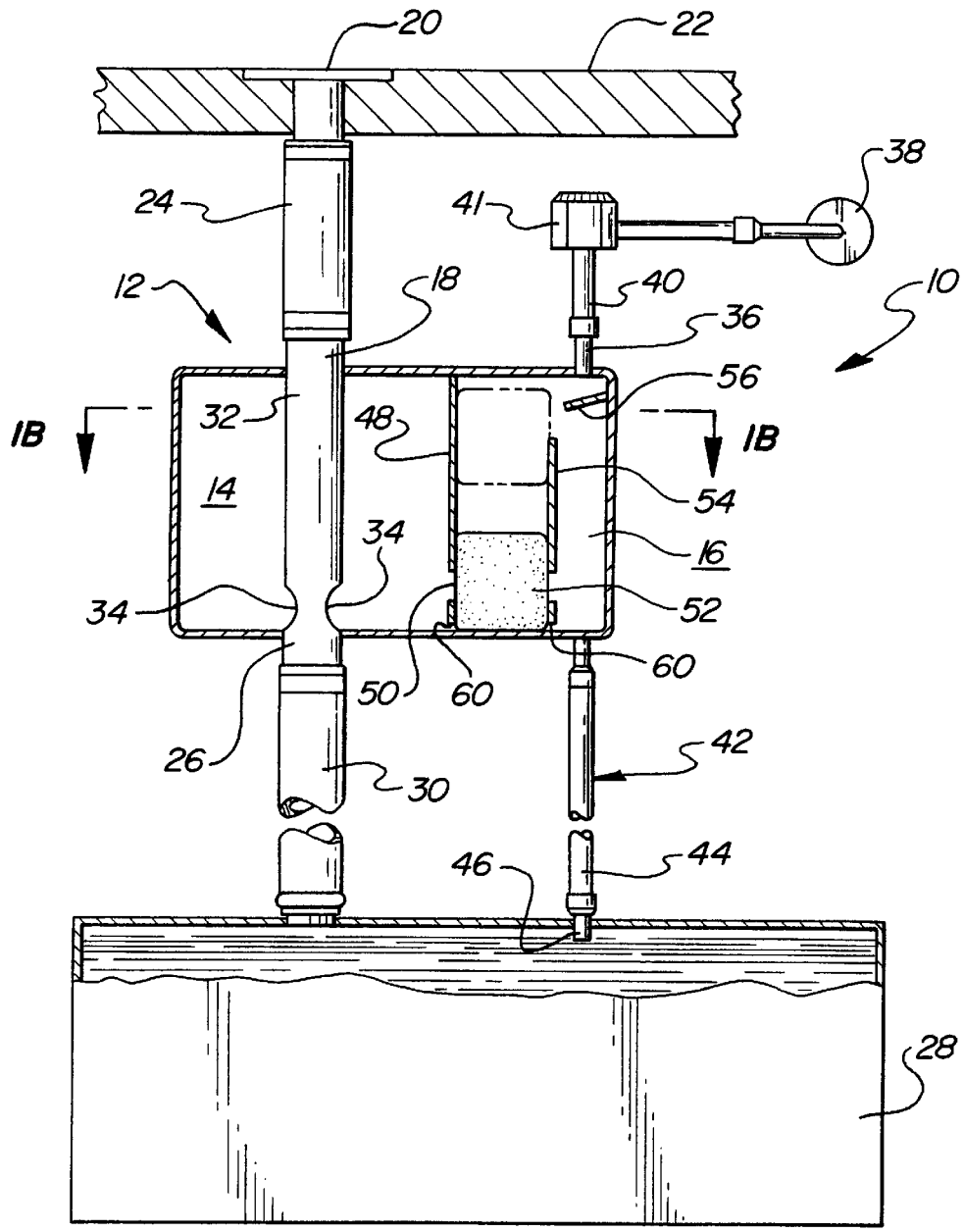
FIG. 1A is a schematic diagram, partially in cross-section illustrating the filling and venting system of the present invention.
Figure 1B:
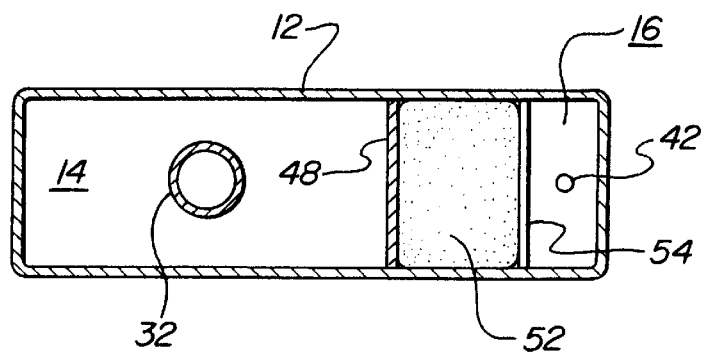
FIG. 1B is a cross-sectional view taken along line 1B—1B of FIG. 1A.

Referring now to FIGS. 1A and 1B there is shown one specific embodiment of a fueling and venting system structured in accord with the principles of the present invention and is generally shown at 10. The system of FIGS. 1A and 1B includes a canister 12 having a fill section 14 and a vent section 16 defined therein. The fill section 14 includes a fuel inlet port 18 which is connected to a fuel filler fitting 20 which, in this embodiment, is mounted into the deck 22 of a watercraft. The fuel inlet port 18 is connected to the fuel filler fitting 20 by a length of fuel hose 24. Fill section 14 further includes a fuel outlet port 26 which in this embodiment includes a fuel fill hose 30 which establishes fluid communication with the fuel tank 28; although it is to be understood that the hose may be eliminated, and connection established directly to the tank 28.

As further illustrated in FIG. 1A, the fuel inlet port 18 and fuel outlet port 26 are connected by fuel fill tube 32 which passes through the fill portion 14 of the canister 12. The tube 32 serves to channel fluid from the inlet port 18 to the outlet port 26 in an efficient manner. The tube 32 also includes a pair of holes 34 near to its junction with the outlet port 26. These holes 34 serve to drain sloshed, spilled or surged fluid from the canister 12 back into the fuel tank 28, as will be explained in greater detail hereinbelow.

The vent section 16 of the canister 12 includes a vapor outlet port 36 which is configured to be attached to a vent 38, which is shown herein as being attached to, and penetrating to the outside of, the hull of the watercraft. The connection between the vapor outlet port 36 and vent 38 is accomplished by a length of tubing 40; although, connection may also be made directly. Optionally, a scrubber 41, such as a charcoal filled canister or a chemical scrubber may be disposed between the vapor outlet port 36 and the vent 38, to further reduce the discharge of hydrocarbon fumes into the atmosphere. The vent section 16 further includes a vapor inlet port 42 which is configured to be attached to the fuel tank 28 so as to permit vapor to pass from the fuel tank 28, through the canister 12 and out the vent 38. The vapor inlet port 42 is configured to project into the fuel tank 28 for a short distance so that it is below the level at which the fuel outlet port 26 enters the tank 28. As illustrated in this embodiment, the vapor inlet port 42 is comprised of a length of vent hose 44 having a coupling 46 which projects into the fuel tank 28 for a short distance, which is typically 3 to 5% of the volume of the fuel tank 28, and which is greater than the distance the connection of the fuel outlet port 26 passes into the tank 28.

The present invention further includes a partition assembly which is disposed within the canister 12 and includes a wall 48 which separates the fill section 14 and vent section 16. The wall includes an opening 50 therein which permits fluid to pass between the fill section 14 and vent section 16. A float 52 is disposed so as to cover the opening 50 when liquid is absent from the interior of the canister 12. The float 52 is further positioned so that it will rise and uncover the openings 50 when the level of liquid in the canister 12 rises above a preselected height. When the opening 50 is uncovered, free fluid communication between the two sections of the canister 12 is established. As further illustrated, the system includes a float guide 54, which cooperates with the wall 48 to restrict and direct the path of travel of the float 52.

It should be noted that the system 10 of the present invention can be mounted, connected and/or built into any portion of the fuel tank 28 including the top, the bottom, the sides, the front or the back of the fuel tank 28.

It should also be noted that the system 10 of the present invention may include a signaling device associated with the float for indicating when the float 52 has risen to some preselected level in the canister 12. This signaling device can be an electronically activated signaling device, such as a switch activated by a magnet associated with the float 52, or it may be a mechanically actuated signaling device such as a linkage of pointers and levers which activate a visible indicator device on the outside of the canister 12. In some embodiments, as will be described hereinbelow with reference to FIG. 3, the signalizing device may be utilized to automatically control a fuel delivery pump. FIG. 1B shows a cross-sectional view of the system of FIG. 1A taken along line B—B.

The system of the present invention operates to prevent overfilling of fuel tank 28 and subsequent spillage. It also operates to prevent loss of fuel occasioned by thermal expansion of the fuel and/or sloshing of the fuel during operation of the watercraft. When the watercraft is being fueled, the fuel fitting 20 is open, and a conventional fuel delivery nozzle inserted therein. Fuel is conveyed to the tank 28, in a relatively unimpeded path, through the hose 24, inlet port 18, tube 32, outlet port 26 and hose 30. While fuel is being introduced into the tank 28, vapor exits the tank 28 through the venting section 16. It is notable that the system provides for relatively unimpeded venting thereby eliminating back venting and surging of fuel through the filler lines. When fuel has risen in the tank 28 to a level such that the projecting portion 46 of the vapor inlet 42 is contacted by the fuel, venting of vapor will be impeded, and back pressure will be created in the fill line. Generally, this back pressure will be sufficient to activate the automatic shutoff found on most fuel delivery systems.

In the event that the automatic shutoff does not activate, or if surging of fuel occurs, this fuel will pass through the holes 34 in the fill tube 32 and accumulate in the canister 12. Likewise, if any fuel flows up the vapor inlet 42 it will also accumulate in the canister 12.

Accumulated fuel will flow back into the tank 28 through the vapor inlet port 42 and/or the fuel inlet 18. In the event that a significant amount of fuel accumulates in the canister 12, fuel passes through limber/drain holes 60 and/or the opening 50 and contacts the float 52, the float 52 will rise thereby uncovering the opening 50 which then creates a relatively unimpeded path for liquid to flow between the two sections of the canister 12; thereby, according the fuel several return paths.

As noted above, the float 52 may be provided with a signaling device to indicate its rise in the canister 12. This feature may be utilized to signal overfilling of the fuel tank, in the event that the automatic shutoff feature of the pump does not work. The set point for the activation of the signal may be selected so that the canister 12 maintains sufficient head space above the retained fuel to prevent its expulsion from the vent fitting 38. The presence of a deflector 56 will further prevent such expulsion.

It will also be appreciated that the system of the present invention will prevent loss of fuel resultant from sloshing in the tank as the watercraft rocks and rolls on the waves. In the event that waves induce a surge in the tank which expels fuel through the fill or vent lines, the canister 12 will catch such a surge and direct it back into the tank 28 thereby preventing it from being expelled through the vent. Also, problems in filling a marine fuel tank have been encountered when a moored boat is being tossed by the waves, since such tossing can temporarily block the vent line causing fuel to back vent through a fill line. In the present system, any such temporary loss of venting will merely result in fuel being expelled into the canister 12 via the holes 34 in the fill tube, and such fuel will then drain back into the tank 28.

Other modifications and variations of the present invention may be implemented. FIG. 2 depicts an enlarged view of the float 52 supported by guides 48 and 54. The float in the FIG. 2 embodiment has a slightly tapered base which allows fuel passing through the opening 50 and/or the holes 60 to cause the float 52 to rise, and it will also be noted that portions of the wall 48 and guide 54 include relatively small drain holes 60 at their base which permit relatively small amounts of liquid that may accumulate in that portion of the system proximate the base of the float 52 to drain therethrough and pass back into the vent and/or fill lines.

Referring now to FIG. 3, there is shown yet another embodiment of the present invention. This embodiment is essentially the FIG. 1A embodiment incorporated into a fueling system generally similar to that previously described. The system of FIG. 3 includes a fuel tank 28 which is in communication with a fuel fill inlet port 18 via a tube 32. As previously described, the system also includes a canister 12 which has a vapor inlet line 42 and a vent line 36 associated therewith. The canister 12 further includes a float 52, as previously described, and this float 52 is restrained and guided by a partition wall 48 and a guide 54.

The embodiment shown in FIG. 3 further includes a fuel fill sensor 70 which is disposed within the canister 12 in a slot 62 formed therein. The sensor 70 is disposed so that upward motion of the float 52 will contact, and activate the sensor 70. The sensor 70 is further operative to provide a control signal, shown herein at 64. The control signal activates a pump controller 68 which is associated with a fuel pump 72 so as to deactivate the fuel pump 72 when the sensor 70 measures a preselected fuel level.

In one preferred embodiment, the control signal 64 is conveyed to the controller (relay) 68 by a wireless data link established between the sensor 70 and the relay 68. This data link may be a radio frequency data link, or it may be an infrared data link. In other preferred embodiments, the control signal is carried by a wire or an optical cable between the sensor 70 and the pump controller 68.

It is anticipated that the fueling systems of the present invention may be manufactured to include a slot 62 which is configured to receive a sensor 70. In this manner, the sensor 70 may be optionally included in the fuel system at the time of its installation, or the sensor 70 may be added as an upgrade at a later date. It is further anticipated that in some instances, the sensor 70 may be made a permanent part of the fuel pump 72, in which instance, the sensor 70 will be fitted into the slot 62 of a particular vehicle at the time it is being fueled, and will be removed therefrom thereafter.

While the sensor 70, and associated slot 62 are shown in the FIG. 3 embodiment as being disposed in the canister portion 12 of the fueling system, alternative placements are also possible. For example, as further shown in FIG. 3, a sensor 70' may be disposed in the fuel tank 28 itself, by means of a slot 62' formed therein. In other instances, a sensor may be placed into the filler neck of a fuel tank 28 prior to filling, and subsequently removed therefrom thereafter.

While the FIG. 3 embodiment depicts a sensor 70, and control module 68 as being associated with a fueling system of the type depicted in FIGS. 1–2, this aspect of the present invention may be implemented in other fuel systems. For example, a sensor may be incorporated into a fuel tank of automobiles, aircraft and the like, and can include an antenna, optical transmitter, electrical connector or other such data transmission link which will establish communication with a fuel pump of a service station or the like. As in the FIG. 3 embodiment, such implementations of the present invention will also operate to prevent overfilling the fuel tanks and/or spills.

Still other embodiments of the present invention will be apparent to one of skill in the art in view of the drawings, discussion and description presented herein. It is the following claims, including all equivalents, which define the scope of the invention.

What is claimed is:

1. A filling and venting system for a fuel tank comprising:

a canister having a fill section and a vent section defined therein, said fill section including a fuel inlet port for the introduction of fuel thereinto, and a fuel outlet port configured to be attached to a fuel tank for directing fuel thereinto, said fuel inlet and said fuel outlet are joined by a fill tube which is disposed in said canister, said fill tube including a least one opening therein which is in communication with the interior of the fill section of said canister, said vent section including a vapor outlet port configured to be attached to a vent, and a vapor inlet port configured to be attached to said fuel tank, so as to permit vapor to pass from said fuel tank, through said canister and to said vent, said vapor inlet port configured to project into said fuel tank to a level below a level at which said fuel outlet port enters said fuel tank;

a partition assembly including a wall separating said fill section and said vent section, said wall having an opening defined therein which permits fluid to flow therethrough, said partition assembly further including a floatable sealing member which is disposed so as to cover said opening in said wall and prevent fluid flow therethrough when a level of liquid in the canister is below a predetermined value, and to uncover said opening when said level of liquid is above said predetermined value.

2. A filling and venting system as in claim 1, further including a signaling mechanism associated with said floatable sealing member, said signaling mechanism being operative to generate a signal in response to displacement of said floatable sealing member by liquid in said canister.

3. A filling and venting system as in claim 1, wherein said fuel outlet port further includes a fill hose associated therewith for establishing fluid communication between said fill section of said canister, and said fuel tank.

4. A filling and venting system as in claim 1, wherein a scrubber is disposed in fluid communications with said vapor outlet port and said vent.

5. A filling and venting system as in claim 1, wherein said wall further includes at least one aperture disposed near its base to allow fuel to flow therethrough.

6. A filling and venting system as in claim 1, wherein said floatable sealing member includes a tapered distal end.

* * * * *